Feb. 23, 1932.  W. R. BROWN  1,846,540
SHIPPING CONTAINER
Filed May 11, 1929
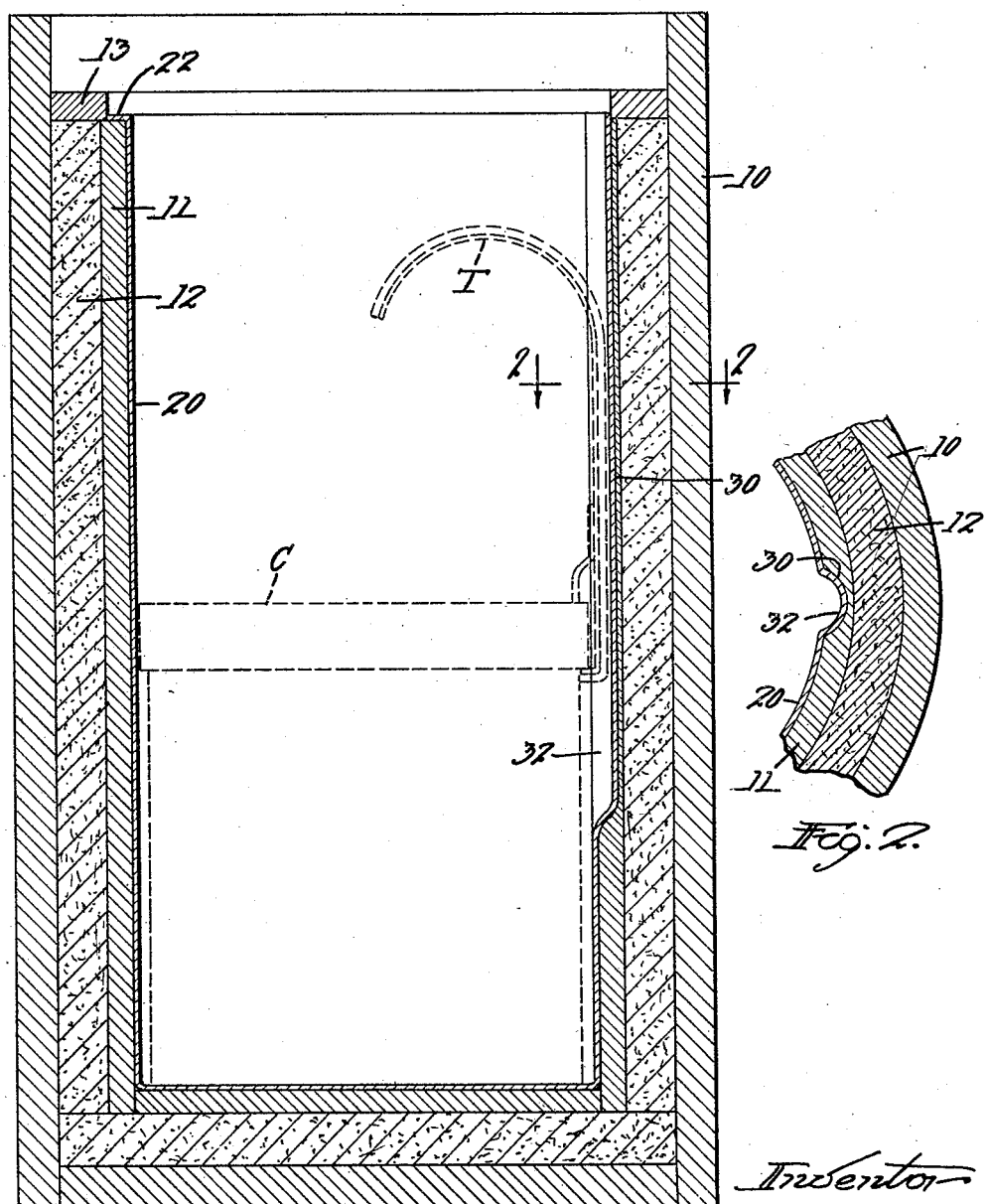

Patented Feb. 23, 1932

1,846,540

UNITED STATES PATENT OFFICE

WILLIAM R. BROWN, OF WINCHENDON, MASSACHUSETTS

SHIPPING CONTAINER

Application filed May 11, 1929. Serial No. 362,395.

This invention relates to a shipping container of the general type shown in my prior Patent No. 1,619,917, dated March 8, 1927. Such containers are provided for shipping ice cream or other frozen products, without the use of ice in the container.

It is the general object of my invention to provide certain improvements in the construction shown in my prior patent, to the end that the useful life of a container may be prolonged and that the insulating properties thereof may be improved.

One feature of my invention relates to the provision of a renewable inner metal casing for the container, by which the inner wood casing is protected and the life of the container is greatly prolonged.

Another feature of my invention consists in certain provisions by which the clearances between the ice cream can or package and the container may be reduced, while removal of the can is facilitated.

My invention further relates to arrangements and combinations of parts which will be hereinafter described and more particularly pointed out in the appended claims.

A preferred form of the invention is shown in the drawings in which

Fig. 1 is a sectional elevation of my improved shipping container, and

Fig. 2 is a partial sectional plan view, taken along the line 2—2 in Fig. 1.

Referring to the drawings, I have shown a shipping container comprising an outer wood casing 10, and an inner wood casing 11 which is spaced from the outer casing both at the sides and bottom, the intervening space being filled with a suitable insulating material 12.

A casing ring 13 fits within the outer casing 10, covering the insulation 12 and projecting partially over the upper edge surface of the inner wood casing 11.

A suitable cover 15 is provided for the container, said cover having a portion 16 of reduced diameter fitting within the top of the casing 10 and having a sheet 17 of insulating material secured to the portion 16 and engaging the casing ring 13.

The construction thus far described is in general substantially similar to that shown in my prior patent, except for the fact that the casing ring 13 projects only partially over the upper edge of the inner casing 11.

In my improved construction, an inner metal casing 20 is fitted within the inner wood casing 11, closely engaging the sides and bottom thereof, and said metal casing is provided with an out-turned flange 22 at its upper end, projecting over the inner portion of the top edge of the casing 11, closely engaging the same and preferably secured thereto.

By the provision of the inner metal casing 20 the life of the container is substantially prolonged, as the wood casing 11 is protected from wear and moisture, and the metal casing 20 may be readily removed and replaced after extended service. By replacement of the metal casing, the container is readily restored substantially to its original condition, and its life is doubled by such replacement.

It has been found that the insulating properties of the container are greatly improved by providing a fairly close sliding fit between the can or package C in which the cream is packed and the inner wall of the container. It is difficult, however, to remove a package closely fitting the container unless provision is made by which a suitable lifting handle or tool may be applied.

Accordingly I have provided a segmental groove 30 in the side wall of the inner wood casing 11, and I have provided an outwardly displaced portion 32 of the inner metal casing 20, fitting within the groove 30 and providing clearance space for the insertion of a suitable lifting handle or tool T.

It is frequently desirable to pack the container with two half-size cans instead of one full-size can and I have continued the groove 30 and displaced portion 32 downward substantially below the middle height of the container, so that the lower as well as the upper can C may be readily grasped and removed.

By thus providing clearance for the tool T, the can C may be caused to fit quite closely within the metal lining 20 and the insulating properties of the container are thereby substantially improved.

Having thus described my invention and the advantages thereof, I do not wish to be limited to the details herein disclosed, otherwise than as set forth in the claims, but what I claim is:—

1. A shipping container comprising an outer wood casing, an inner wood casing spaced therefrom at the sides and bottom, insulating material fitting the space between said inner and outer casings, a casing ring fitting within said outer casing and projecting partially over said inner casing, and a removable inner metal casing fitting closely within said inner wood casing and having an outwardly flanged top portion extending over and closely engaging the inner portion of the upper edge of said inner casing, and abutting said casing ring, said metal casing and said casing ring being separate and distinct from each other.

2. A shipping container as set forth in claim 1, in which the inner wood casing is grooved vertically along its inner surface for a substantial distance downward from its upper edge at one side thereof, and in which the inner metal casing has a portion displaced outwardly and fitting the grooved portion of said inner wood casing, said displaced portion providing clearance for the insertion of a can-removing tool and permitting a close sliding fit of a can in said metal casing.

In testimony whereof I have hereunto affixed my signature.

WILLIAM R. BROWN.